United States Patent
Kuroiwa

(10) Patent No.: US 9,262,394 B2
(45) Date of Patent: Feb. 16, 2016

(54) DOCUMENT CONTENT ANALYSIS AND ABRIDGING APPARATUS

(75) Inventor: Yukiko Kuroiwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 550 days.

(21) Appl. No.: 13/637,321

(22) PCT Filed: Mar. 14, 2011

(86) PCT No.: PCT/JP2011/055895
§ 371 (c)(1),
(2), (4) Date: Nov. 21, 2012

(87) PCT Pub. No.: WO2011/118428
PCT Pub. Date: Sep. 29, 2011

(65) Prior Publication Data
US 2013/0067324 A1    Mar. 14, 2013

(30) Foreign Application Priority Data
Mar. 26, 2010 (JP) .................................. 2010-071860

(51) Int. Cl.
G06F 17/22 (2006.01)
G06F 17/27 (2006.01)
G06F 17/30 (2006.01)
G06F 9/44 (2006.01)

(52) U.S. Cl.
CPC .......... *G06F 17/27* (2013.01); *G06F 17/30011* (2013.01); *G06F 17/30253* (2013.01); *G06F 8/10* (2013.01)

(58) Field of Classification Search
None
See application file for complete search history.

(56) References Cited

U.S. PATENT DOCUMENTS 5,608,396 A * 3/1997 Cheng et al. .................... 341/50
6,041,323 A * 3/2000 Kubota
6,198,846 B1 * 3/2001 Nishiwaki ..................... 382/178
(Continued)

FOREIGN PATENT DOCUMENTS

JP      02-257266 A      10/1990
JP      06-067862 A      3/1994
(Continued)

OTHER PUBLICATIONS

Internationap Preliminary Report on Patentability issued Oct. 23, 2012 in PCT/JP2011/055895.
(Continued)

*Primary Examiner* — Maikhanh Nguyen
(74) *Attorney, Agent, or Firm* — Sughrue Mion, PLLC

(57) ABSTRACT

A requirement acquisition system for grasping requirements from related documents such as documents the client holds, investigation results of an interview or questionnaire, meeting minutes, specification and the like, in system or software development, by reduced efforts and hours is provided. In particular, from a document being a group of character strings, one or more partial string which is a common part of the plurality of character strings is extracted as an important phrase. When the important phrase does not exist, the processing is finished. When the important phrase exists, a representative character string of the document is extracted as a candidate character string, deleting the candidate character string is deleted from the document, and the important phrase is deleted from the candidate character string. When the number of the important phrase being deleted is one or more, the candidate character string is set as an important character string.

7 Claims, 4 Drawing Sheets

(56) References Cited

U.S. PATENT DOCUMENTS

| | | |
|---|---|---|
| 6,665,668 B1* | 12/2003 | Sugaya et al. ............... 707/730 |
| 6,738,786 B2* | 5/2004 | Sugaya et al. |
| 7,191,177 B2* | 3/2007 | Konaka .......................... 707/758 |
| 7,783,476 B2* | 8/2010 | Yang .............................. 704/10 |
| 7,792,369 B2* | 9/2010 | Minagawa et al. ........... 382/229 |
| 8,135,218 B2* | 3/2012 | Takahashi et al. ............ 382/182 |
| 8,296,130 B2* | 10/2012 | Spears ............................. 704/9 |
| 8,296,679 B2* | 10/2012 | Fux et al. ...................... 715/816 |
| 8,311,807 B2* | 11/2012 | Kang et al. ..................... 704/10 |
| 8,375,446 B2* | 2/2013 | Eiland et al. ................... 726/23 |
| 8,868,402 B2* | 10/2014 | Korolev et al. .................. 704/1 |
| 2001/0009009 A1* | 7/2001 | Iizuka ........................... 707/539 |
| 2002/0042794 A1* | 4/2002 | Konaka ............................ 707/6 |
| 2002/0116398 A1* | 8/2002 | Sugaya et al. ................. 707/200 |
| 2004/0257988 A1* | 12/2004 | Evans et al. ................... 370/230 |
| 2005/0251384 A1* | 11/2005 | Yang .............................. 704/10 |
| 2009/0077122 A1* | 3/2009 | Fume et al. ............... 707/103 R |
| 2009/0226872 A1* | 9/2009 | Gunther ........................ 434/350 |
| 2010/0100368 A1* | 4/2010 | Fux et al. ......................... 704/3 |
| 2010/0107255 A1* | 4/2010 | Eiland et al. ................... 726/23 |
| 2011/0191097 A1* | 8/2011 | Spears ............................. 704/9 |
| 2011/0191105 A1* | 8/2011 | Spears ........................... 704/251 |

FOREIGN PATENT DOCUMENTS

| | | |
|---|---|---|
| JP | 2003-108571 A | 4/2003 |
| JP | 2008-234049 A | 10/2008 |

OTHER PUBLICATIONS

Aguilera, Christine, et al., "The Use of a Repeated Phrase Finder in Requirements Extraction," Journal of Systems and Software, 1990, pp. 209-230, vol. 13.

Hasegawa, Ryo, et al., "Extracting Conceptual Graphs from Japanese Documents for Software Requirements Modeling," Proceedings of the Sixth Asia-Pacific Conference on Conceptual Modelling (APCCM 2009), pp. 87-96, http://crpit.com/confpapers/CRPITV96Hasegawa.pdf.

Fujiwara et al. "Product/Service Value Validation based on Kolmogorov Complexity", Forum on Information Technology, Aug. 20, 2009, pp. 55-62.

Nara et al. "Keyword Extraction Using a Text Format and Word Importance in a Specific Field", Journal of Information, Feb. 15, 1997, vol. 38, No. 2, pp. 299-309.

\* cited by examiner

DOCUMENT CONTENT ANALYSIS AND ABRIDGING APPARATUS

CROSS REFERENCE TO RELATED APPLICATIONS

This application is a National Stage of International Application No. PCT/JP2011/055895, filed on Mar. 14, 2011, which claims priority from Japanese Patent Application No. 2010-071860, filed on Mar. 26, 2010, the contents of all of which are incorporated herein by reference in their entirety.

TECHNICAL FIELD

The present invention relates to a requirement acquisition system, and in particular, relates to a requirement acquisition system for acquiring requirements from related documents such as documents the client holds, investigation results of interview or questionnaire on the client, minutes of meetings with the client, or a user requirement specification in which requirements of the client is sorted, in system or software development.

BACKGROUND ART

In system or software development, to acquire requirements regarding conditions or capabilities the development system must satisfy for solving problems or achieving objects from the client is called as the requirement acquisition. In requirement acquisition, the requirements must be grasped with consideration of important phrases of related documents or relations therebetween for extracting the client's requirements without omission and utilizing them for the specifications and designs.

Conventionally, in the requirement acquisition, an analyzer extracts important phrases manually, and grasps the requirements by the clue of those important phrases with linking similar contents described in different parts thereof. However, it requires a lot of efforts and hours for extracting important phrases and linking them with repeatedly reading a large volume of documents. Further, important parts may be omitted caused by human errors.

There are methods of extracting nouns, verbs and the like for supporting the analyzer by the morphological analysis (syntactic analysis). In the requirement acquisition method described in non-patent literature 1, for example, nouns and verbs are extracted. Further, in the requirement acquisition support device described in patent literature 1 (Japanese Patent Application Publication JP-A-H06-067862), division to words is performed by the syntactic analysis and detailed patterns are retrieved.

There is also a method without dividing to words in advance and extracting partial strings which emerges in plural times in related documents as important phrases. In the phrase extraction method described in non-patent literature 2, for example, phrases which repeatedly emerge are extracted as important phrases.

However, in methods of extracting important phrases as described in patent literature 1, non-patent literatures 1 and 2, when the analyzer determines the mean of an extracted phrase, the analyzer must refer to the original document and check it. Normally, a large number of phrases is extracted, and the number of sentences including these phrases is also large, so that huge efforts and hours are required for checking operation similarly to the case of manual extraction which is performed conventionally.

Further, one requirement does not always include only one important phrase, and in most cases, a plurality of important phrases like a noun and a verb are included. Therefore, it is difficult to link important phrases to the original document, because it is required to determine what kind of combination of important phrases are to be linked.

Moreover, when important phrases are extracted, in the method of dividing into words in advance by the morphological analysis as described in non-patent literature 1 and patent literature 1, there is a problem where the words cannot be extracted correctly caused by erroneous word division. For example, "gaikokujin-sanseiken", which means "foreigners-suffrage", may be divided into "gaikoku" "ninjin" "seiken" ("ninjin" is another reading of "jinsan" in Chinese characters), which means "foreign country"—"carrot"—"regime". In addition, there is also a problem that unknown words which are not registered in the dictionary used in the morphological analysis cannot be extracted. Therefore, for example, an abbreviation like the English string "ABC" cannot be extracted.

In a method of extracting partial strings which emerge in plural times from related documents as described in non-patent literature 2, because many similar phrases are extracted, it is required to determine whether the extracted phrases are important phrases or not to choose or refuse them by checking the original document. As a result, there is a problem that efforts and hours for determination are needed.

As a related technique, in patent literature 2 (Japanese Patent Application Publication JP2008-234049A), an abstract text generation device and an abstract sentence generation program are disclosed. In this related technique, when selecting a sentence whose degree of similarity with another sentence is equal to or more than a preset threshold value, it is extracted in order without repeatedly calculating the degree of similarity, and the threshold value is necessary to be determined in advance.

CITATION LIST

Patent Literature

[PTL 1] Patent literature 1: Japanese Patent Application Publication JP-A-H06-067862
[PTL 2] Patent literature 2: Japanese Patent Application Publication JP2008-234049A

Non-Patent Literature

[NPTL 1] Non patent literature 1: Ryo Hasegawa, Motohiro Kitamura, Haruhiko Kaiya, Motoshi Saeki, "Extracting Conceptual Graphs from Japanese Documents for Software Requirements Modeling", Proceedings of the Sixth Asia-Pacific Conference on Conceptual Modelling (APCCM 2009), pages 87-96, <http://crpit.com/confpapers/CRPITV96Hasegawa.pdf>.
[NPTL 2] Non patent literature 2: Aguilera, C. Berry, D. M., "The Use of a Repeated Phrase Finder in Requirements Extraction", Journal of Systems and Software, 1990, volume 13, pages 209-230.

SUMMARY OF INVENTION

An object of the present invention is to provide a requirement acquisition system, a requirement acquisition method, and a requirement acquisition program for acquiring requirements from related documents without efforts or hours of the analyzer.

According to the present invention, a requirement acquisition system includes: a phrase extraction section configured to extract, from a document being a group of a plurality of character strings, one or more partial string which is a common part of the plurality of character strings as an important phrase; a character string extraction section configured to finish processing when the important phrase does not exist, and the character string extraction section is configured to extract a representative character string of the document as a candidate character string and delete the candidate character string from the document when the important phrase exists; a phrase deletion section configured to delete the important phrase from the candidate character string; and a character string addition section configured to set the candidate character string as an important character string when the number of the important phrase being deleted is one or more.

A requirement acquisition method according to the present invention is a requirement acquisition system implemented by a computer. The requirement acquisition method includes: extracting, from a document being a group of a plurality of character strings, one or more partial string which is a common part of the plurality of character strings as an important phrase; finishing processing when the important phrase does not exist; extracting a representative character string of the document as a candidate character string when the important phrase exists; deleting the candidate character string from the document; deleting the important phrase from the candidate character string; and setting the candidate character string as an important character string when the number of the important phrase being deleted is one or more.

A requirement acquisition program according to the present invention is a program for making a computer perform the following steps: extracting, from a document being a group of a plurality of character strings, one or more partial string which is a common part of the plurality of character strings as an important phrase; finishing processing when the important phrase does not exist; extracting a representative character string of the document as a candidate character string when the important phrase exists; deleting the candidate character string from the document; deleting the important phrase from the candidate character string; and setting the candidate character string as an important character string when the number of the important phrase being deleted is one or more. Note that, the requirement acquisition program according to the present invention can be stored in a storage device or a storage medium.

Not merely listing important phrases, but important parts of sentences and the like can be extracted, and an outline of the requirements can be grasped by interpreting the meanings without referring to the original document.

EXEMPLARY EMBODIMENTS

First Exemplary Embodiment

A first exemplary embodiment of the present invention will be explained below with reference to the accompanying drawings.

Figure 1:
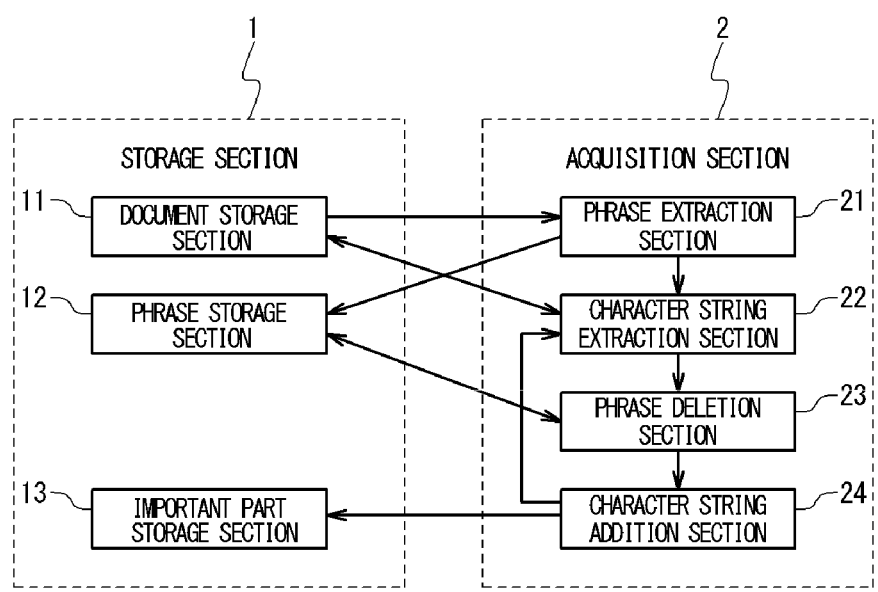
FIG. 1 is a block diagram showing an example of a requirement acquisition system according to a first exemplary embodiment of the present invention.

As shown in FIG. 1, a requirement acquisition system according to the first exemplary embodiment of the present invention includes a storage section 1 and an acquisition section 2.

In the following explanation, each element obtained by dividing related documents, for example, documents the client holds, investigation results of an interview or questionnaire, meeting minutes, or specifications, by the unit of meaning is called as a character string.

In a case of a document in which one item is written in one row, for example, the one row can be called as the character string. Also in a case of an investigation result of a questionnaire, when an answer of one person is supposed to have one meaning, a plurality of sentences being the answer of one person can be called as the character string. Also in a case of documents where each paragraph has unity, the paragraph can be called as the character string. Also in a case of documents where each chapter has unity, the chapter is called as the character string. In a case of documents in which a case where the meaning unit is punctuated as a sentence by commas/periods and a case where the meaning unit is punctuated by row are mixed, the sentence and the row can also be called as the character string, respectively.

The document is related documents like a document the client holds, an investigation result of an interview or questionnaire, meeting minutes, or specifications, and includes character strings. In the following explanation, when a document includes a plurality of documents like the first version, the second version and so on, and there is a demand to analyze them simultaneously, the plurality of documents are totally called as a document. Also in a case where a document includes a plurality of documents having different formats like meeting minutes and specifications, whole of the plurality of documents are supposed to be called as a document.

The storage section 1 includes a document storage section 11, a phrase storage section 12, and an important part storage section 13.

The document storage section 11 stores documents which are targets of the analysis. Here, the document storage section 11 stores documents of the analysis target in advance.

The phrase storage section 12 stores a group of phrases. Here, the phrase storage section 12 stores a group of phrases extracted from the analysis target document.

The important part storage section 13 stores the phrases extracted from the analysis target document as important parts by adding them one by one.

The acquisition section 2 has a phrase extraction section 21, a character string extraction section 22, a phrase deletion section 23, and a character string addition section 24.

The phrase extraction section 21 extracts a group of phrases from the documents stored in the document storage section 11 and stores them in the phrase storage section 12. Here, the character string extraction section 22 deletes a character string from the document stored in the document storage section 11 every time when the character string is extracted.

The character string extraction section 22 finishes the processing when the number of phrases stored in the phrase storage section 12 is 0. Here, the character string extraction section 22 extracts one character string (the candidate character string) being representative from the document stored in the document storage section 11 when the number of phrases is one or more.

The phrase deletion section 23 deletes 0 or more number of phrases from the phrase storage section 12. Here, the phrase deletion section 23, when a phrase included in one character string extracted by the character string extraction section 22 exists in the phrase storage section 12, deletes the phrase from the phrase storage section 12.

The character string addition section 24 adds the character strings extracted by the character string extraction section 22 to the important part storage section 13 one by one. Here, the character string addition section 24 additionally stores one character string extracted by the character string extraction section 22 in the important part storage section 13 as an important character string when the number of phrases deleted by the phrase deletion section 23 is one or more. Then, the character string addition section 24 passes the processing to the character string extraction section 22 regardless of the number of the deleted phrases.

[Examples of Hardware]

As examples of the requirement acquisition system, a computer such as a PC (personal computer), appliance, workstation, mainframe, supercomputer and the like is assumed. As other examples, a mobile phone, smartphone, smartbook, car navigation system, portable game console, video game console, portable audio player, handy-terminal, gadget (electronic device), interactive television, digital tuner, digital recorder, information home appliance, OA (Office Automation) device can be considered. The requirement acquisition system may be mounted on a vehicle, ship, airplane and the like. Further, the requirement acquisition system may be a Virtual Machine (VM) environment built on a computer. However, actually, it is not limited to these examples.

As examples of the storage section 1, a semiconductor storage device such as a RAM (Random Access Memory), ROM (Read Only Memory), EEPROM (Electrically Erasable and Programmable Read Only Memory), or a flash memory, and an auxiliary storage such as an HDD (Hard Disk Drive), SSD (Solid State Drive) or the like, and a removable disk such as a DVD (Digital Versatile Disk) or the like, and a storage media such as an SD (Secure Digital) memory card can be considered. Further, the storage section 1 is not limited to the storage device mounted on the computer main body, but may be a storage device mounted on a peripheral device (an external HDD and the like) or an external server, or a DAS (Direct Attached Storage), FC-SAN (Fibre Channel-Storage Area Network), NAS (Network Attached Storage), IP-SAN (IP-Storage Area Network). Moreover, the storage section may be a computer and the like.

As examples of the acquisition section 2, a CPU (Central Processing Unit), microprocessor, microcontroller, or an Integrated Circuit (IC) having a dedicated function can be considered. Further, the acquisition section 2 may be a computer.

However, actually, the present invention is not limited to these examples.

Figure 2:
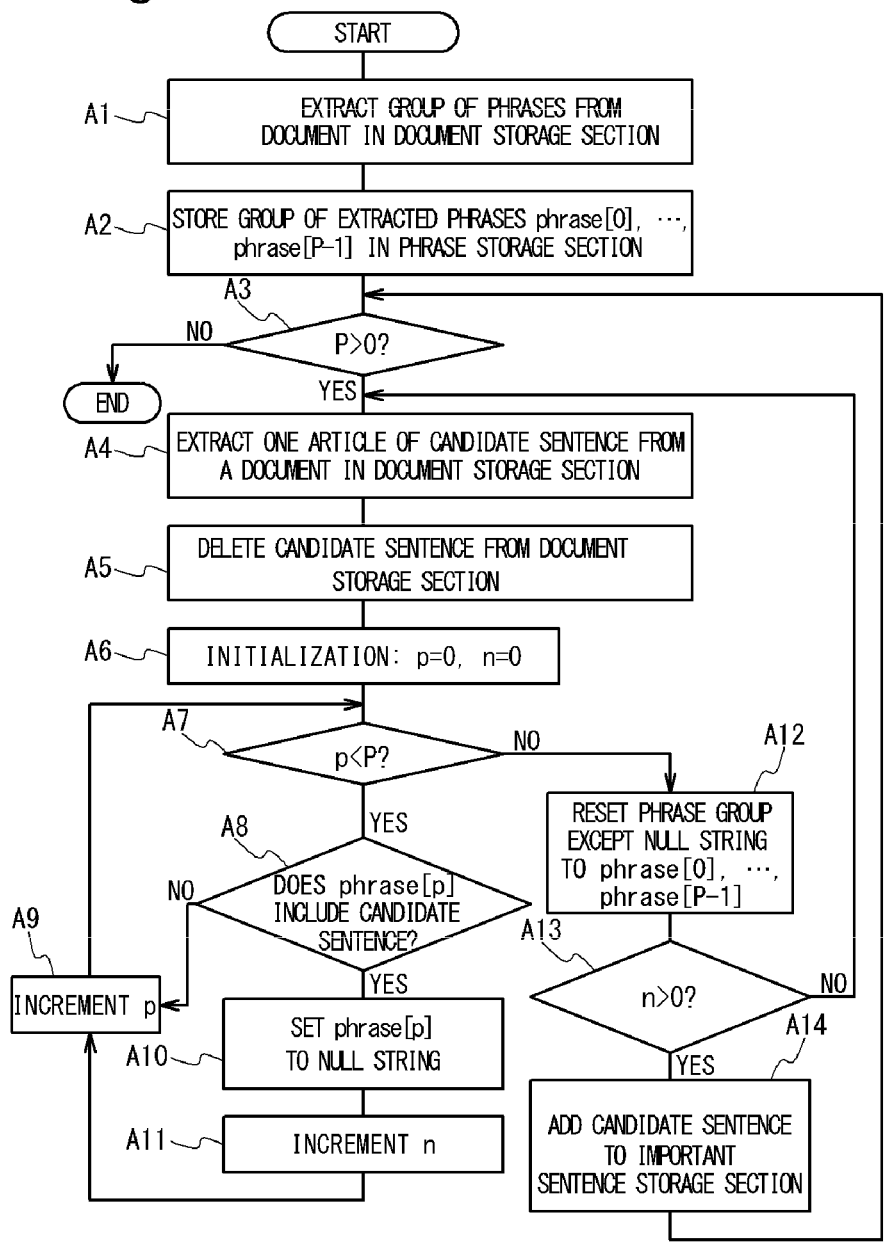
FIG. 2 is a flowchart showing an example of a processing passage of a requirement acquisition system according to the first exemplary embodiment of the present invention.

Operation of the Requirement Acquisition System of the First Exemplary Embodiment FIG. 2 is a flowchart showing an example of a processing passage of a requirement acquisition system according to the present invention. For example, when a document is inputted via an input device and the like and stored in the document storage section 11, the requirement acquisition system operates as follows. In the following, a case where a sentence is used as the character string is explained as an example.

(1) Step A1

At first, the phrase extraction section 21 extracts a group of important phrases from the document stored in the document storage section 11.

Here, a sentence is assumed to be a character string being queuing characters. Assumed that "$A=\{a_0, a_1, \ldots, a_{n-1}\}$" is n number of characters, each character $a_i$ is one character among Hiragana, Katakana (Japanese characters), Kanji (Chinese character) and the like. Assumed that "A*" is a group of a character string of a finite length on A, each element of "A*" is a word, sentence and the like.

The important phrase is assumed to be, for example, character strings which emerge commonly in a preliminary designated number or more of sentences. As a designated number, for example, the number of "2" and the like is designated and inputted. The designated number may be inputted via an input device like a keyboard by a user of the requirement acquisition system, or may be designated by any other manner.

A partial string "S(st, len)" of a character string S is assumed to be a queue of "len" number of characters from "st"-th character of S. For example, when S="kouho-chuushutsu-bu" ("candidate-extraction-section" in Japanese, which are represented by 2-2-1 number of Chinese characters respectively), S(0,1)="kou", S(0,2)="kouho", S(2,2)="chuushutsu". For character strings S and T being two sentences, when the character string "cand" is called as a common partial string, it means that "st1", "st2", and "len" exist which satisfy: cand=S(st1, len)=T(st2, len).

Note that the phrase may be limited to the partial string having the maximum length for reducing the number of phrases stored in the phrase storage section 12. When the character string "cand" is the partial string of the maximum length for the character strings S and T, it means that: the "st1", "st2", "len" exist which satisfy: cand=S (st1, len)=T (st2, len); "cand•a" is not a partial string of both of the character strings S and T; and "a•cand" is not a partial string of both of the character strings S and T for any a∈A. For example, the maximum length partial string of S="extracting important phrases" and T="important phrases mean common partial strings" is "important phrases". "important" is not the maximum length partial string because "a"="phrase" exists and "and•a" is a partial string of both of character strings S and T.

Further, for reducing the number of phrases stored in the phrase storage section 12, phrases which are not required to be extracted such as "following", "aforementioned", and phrases which is unnecessary for the prefix or postfix such as "," or "." may be set in advance to omit them from the extracted phrases.

(2) Step A2

Next, the phrase extraction section 21 stores the group of extracted phrases in the phrase storage section 12.

Here, the number of extracted phrases is represented by P, and the extracted i-th phrase is represented by phase [i]. Then, the group of extracted phrases is represented by phase[0], . . . , phase[P−1].

(3) Step A3

The character string extraction section 22 compares the number of phrases P stored in the phrase storage section 12 and 0. When P is larger than 0 (P>0), the processing proceeds on to STEP A4, and when P is 0 (P=0), the processing is finished.

(4) Step A4

The character string extraction section 22 extracts one candidate sentence being a candidate of an important sentence from the document stored in the document storage section 11.

The extraction of candidate sentence is performed by the following manner, for example. The distance between each sentence of the document stored in the document storage section 11 and whole of the document stored in the document storage section 11 is investigated, and the sentence whose distance is minimum is extracted as a candidate sentence. Here, the distance does not mean the spatial distance, and means the degree of difference (or similarity) between two character strings. Namely, the distance can be understood as a similarity. For example, as examples of the distance between character strings, the Levenshtein distance, the edit distance and the like are known conventionally.

The distance between each sentence and whole document can be calculated, for example by the following manner, using compression.

At first, assuming that an algorithm for compressing the text is designated. The compression algorithm may be inputted via an input device like a keyboard by a user of the requirement acquisition system, or may be designated by any other manner. As an example of the compression algorithm, "gzip" is known.

Assuming that the size of the i-th sentence stored in the document storage section 11 after the compression is represented by "C (i)", the size of whole document after compression is represented by "C (all)", the size of i-th sentence in addition to the whole document after compression is represented by "C (all•i)", the distance between i-th sentence and the whole document is calculated by the following [equation 1] or [equation 2].

[equation 1]

$$\frac{C(all \cdot i)}{C(all) + C(i)} \quad (1)$$

[equation 2]

$$\frac{C(all \cdot i) - C(i)}{C(all)} \quad (2)$$

These can be considered to be approximation methods of the Kolmogorov complexity, respectively. For the compression size, the more the partial strings coincide, the coincident part can be represented by shorter signs, so that the more the i-th sentence and the whole document coincide partially, the distance calculated by [equation 1] or [equation 2] becomes smaller.

Alternatively, assuming the case where i-th sentence is omitted from the whole document is represented by "C(all-i)", the compression size may be calculated by the following [equation 3] or [equation 4].

[equation 3]

$$\frac{C(all)}{C(all-i) + C(i)} \quad (3)$$

[equation 4]

$$\frac{C(all) - \min\{C(i), C(all-i)\}}{\max\{C(i), C(all-i)\}} \quad (4)$$

(5) Step A5

Next, the character string extraction section 22 deletes the extracted candidate sentence from the document storage section 11.

(6) Step A6

The phrase deletion section 23 initializes the phrase number p by substituting 0 into p (p=0), and initializes the deletion phrase number n by substituting 0 into n (p=0). Here, the phrase number p indicates the order of the phrases stored in the phrase storage section 12. The deletion phrase number n indicates the phrases to be deleted.

(7) Step A7

The phrase deletion section 23 compares the phrase number p and the number of phrases P stored in the phrase storage section 12. When p is less than P (p<P), the processing proceeds to STEP A8, and when p is P or more (p≥P), the processing proceeds to STEP A12.

(8) Step A8

The phrase deletion section 23 investigates whether or not the candidate sentence includes the p-th phrase phrase [p] stored in the phrase storage section 12. When phrase [p] is not included in the candidate sentence, the processing proceeds to STEP A9, and when phrase [p] is included in the candidate sentence, the processing proceeds to STEP A10.

(9) Step A9

The phrase deletion section 23 increments the phrase number p by 1. After that, the processing returns to STEP A7.

(10) Step A10

The phrase deletion section 23 sets phrase [p] to be the null string when p-th phrase [p] stored in the phrase storage section 12 is included in the candidate sentence.

(11) Step A11

The phrase deletion section 23 increments the deletion phrase number n by 1. After that, the processing proceeds to STEP A9, and the phrase number p is incremented by 1. After that, the processing proceeds to STEP A7.

(12) Step A12

The phrase deletion section 23 renumbers the P-n number of phrases stored in the phrase storage section 12 except null string to be phrase[0], . . . , phrase[P-n−1], and substitutes P-n into P.

(13) Step A13

The character string addition section 24 compares the number of phrases n which is deleted by the phrase deletion section 23 as the null string with 0. When the number of phrase n is larger than 0 (n>0), the processing proceeds to STEP A14, and when the number of phrase n is (n=0), the processing returns to STEP A4.

(14) Step A14

The character string addition section 14 additionally stores the candidate sentence in the important phrase storage section as an important sentence. After that, the processing proceeds to STEP A3.

Note that, when the important sentence is known in advance, the present invention may be implemented by storing a group of the important phrases in the phrase storage section 12 without extraction of the phrases by the phrase extraction section 21. In this case, the storing of the group of the important phrases may be performed by a user of the requirement acquisition system inputting via an input device like a keyboard, and also may be designated by any other manner.

In the present exemplary embodiment, not merely listing important phrases, but important parts of sentences and the like can be extracted, so that an analyzer can grasp an outline of the requirement by interpreting the meanings without referring to the original document. Therefore, efforts and hours of the analyzer can be reduced.

Further, in the present exemplary embodiment, the morphological analysis is not adopted, by which an erroneous word dividing may occur, and coined words or unknown words cannot be treated. Therefore, important parts can be extracted more correctly compared with the case of using the morphological analysis.

Second Exemplary Embodiment

Figure 3:
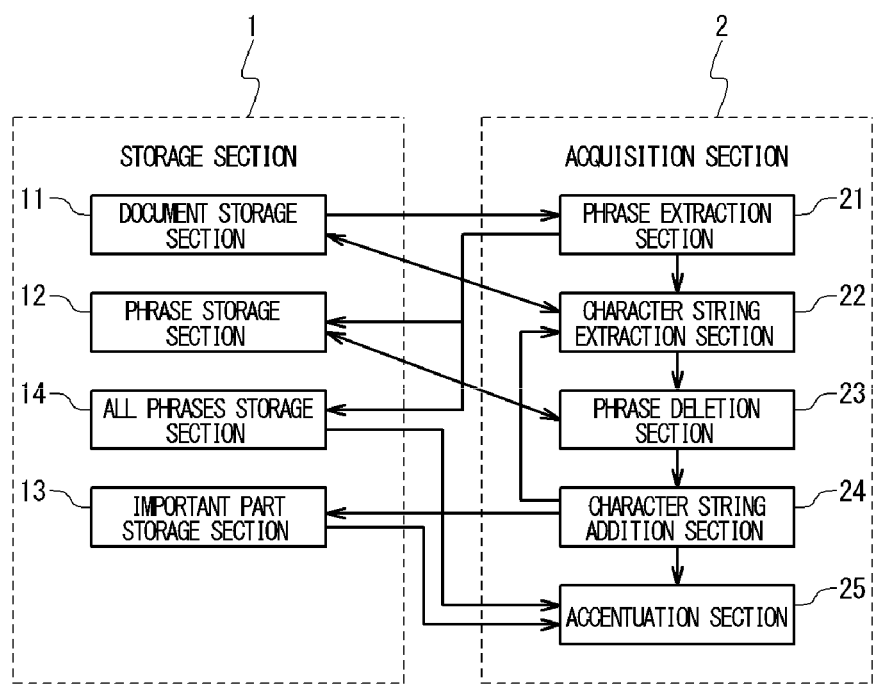
FIG. 3 is a block diagram showing an example of a requirement acquisition system according to a second exemplary embodiment of the present invention.

As shown in FIG. 3, a requirement acquisition system according to a second exemplary embodiment of the present invention includes a storage section 1 and an acquisition section 2.

The storage section 1 includes a document storage section 11, a phrase storage section 12, an important part storage section 13, and an all phrases storage section 14.

The document storage section 11, the phrase storage section 12, and the important part storage section 13 are same to those of the first exemplary embodiment. Namely, the storage section 1 of the present exemplary embodiment may be implemented by adding the all phrases storage section 14 to the storage section 1 of the first exemplary embodiment.

The all phrases storage section 14 stores the group of all phrases extracted by the phrase extraction section 21 before the finishing of processing.

The acquisition section 2 includes a phrase extraction section 21, a character string extraction section 22, a phrase deletion section 23, a character string addition section 24, and an accentuation section 25.

The phrase extraction section 21 extracts a group of phrases from the document stored in the document storage section 11 and stores it in the phrase storage section 12 and the all phrases storage section 14. A difference from the phrase extraction section 21 of the first exemplary embodiment is in that the group of the phrases is stores not only in the phrase storage section 12 but also in the all phrases storage section 14.

The character string extraction section 22, the phrase deletion section 23, the character string addition section 24 are same to those of the first exemplary embodiment. Namely, the acquisition section 2 of the present exemplary embodiment may be implemented by adding the accentuation section 25 to the acquisition section 2 of the first exemplary embodiment.

The accentuation section 25 accentuates and displays the part of the phrases stored in the all phrases storage section 14 among the group of the character strings stored in the important part storage section 13. Alternatively, the accentuation section 25 may accentuate and display either one of or both of the group of the character strings stored in: the important part storage section 13; and the group of phrases stored in the all phrases storage section 14, among the original document being the analysis target.

Operation of Requirement Acquisition System of Second Exemplary Embodiment

In the processing of the phrase extraction section 21 according to the present exemplary embodiment, in addition to the processing of the phrase extraction section 21 according to the first exemplary embodiment, the group of the phrases is stored also in the all phrases storage section 14. In all phrases storage section 14, phrases are not deleted through the processing, so that all phrase group extracted by the phrase extraction section 21 remains until the finishing of the processing.

Figure 4:
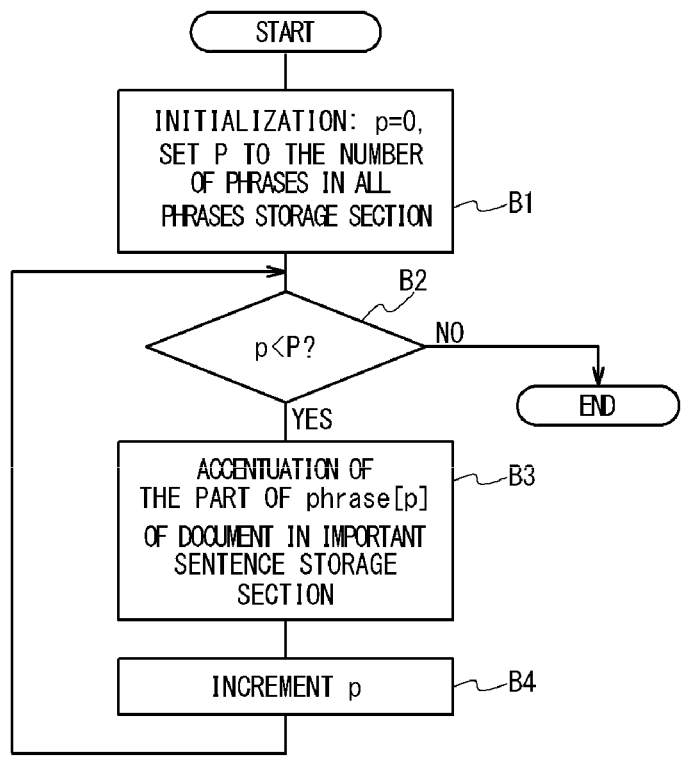
FIG. 4 is a flowchart showing an example of a processing passage of the accentuation section of a requirement acquisition system according to the second exemplary embodiment of the present invention.

FIG. 4 is a flowchart showing an example of a processing passage of a requirement acquisition system according to the present invention. Here, an example where a sentence is used as the character string is explained.

(1) Step B1

At first, the accentuation section 25 initializes the phrase number p by substituting 0 (p=0), and set the all phrase number P to the number of phrases stored in the all phrases storage section 14.

(2) Step B2

Next, the accentuation section 25 compares the phrase number p and the all phrase number P. At this time, when the phrase number p is less than the all phrase number P (p<P), the processing proceeds to STEP B3, and when the phrase number p is P or larger (p≥P), the operation is finished.

(3) Step B3

The accentuation section 25 retrieves the part of the p-th phrase phrase[p] stored in the all phrases storage section 14 among the document being the group of the important sentences stored in the important part storage section 13, and accentuates the part of the phrase[p].

Here, the accentuation means any one of, or any combination of the following (A) to (I):

(A) change the color of the displayed character string;
(B) change the face of the character string (bold, italic and the like);
(C) underline the character string;
(D) enclose the character string by signs such as brackets;
(E) change the background color of the character string;
(F) shade the area other than the character string;
(G) add a sign over or below the character string;
(H) break (and indent) the line of the part of the character string; and
(I) insert a space, sign and the like before and after the character string.

(4) Step B4

The accentuation section 25 increments the phrase number p by 1. After that, the processing returns to STEP B2.

At last, the accentuation section 25 may output the important phrases to an output device such as a display, printer and the like by accentuating and displaying them when the phrase number p becomes the all phrases number P or larger (p≥P) and the operation is finished at STEP B2.

In the second exemplary embodiment, it is possible to display the important part by accentuating it. As a result, the user of the requirement acquisition system can watch the important phrases by focusing on them, and the efforts and hours for grasping the requirements can be reduced.

Note that, the above-mentioned exemplary embodiments can be implemented by combining them.

INDUSTRIAL APPLICABILITY

The present invention can be applied, for example, to the important part extraction from documents. In particular, the present invention can be applied to the requirement acquisition from related documents such as documents the client holds, investigation results of an interview or questionnaire, meeting minutes, specification and the like, in system or software development.

Features of the Present Invention

As explained above, an object of the present invention is to grasp the requirements from related documents such as documents the client holds, investigation results of an interview or questionnaire, meeting minutes, specification and the like, in system or software development, by reduced efforts and hours.

According to the present invention, a requirement acquisition system includes: a phrase extraction section configured to extract, from a document being a group of a plurality of character strings, one or more partial string which is a common part of the plurality of character strings as an important phrase; a character string extraction section configured to finish processing when the important phrase does not exist, and the character string extraction section is configured to extract a representative character string of the document as a candidate character string and delete the candidate character string from the document when the important phrase exists; a phrase deletion section configured to delete the important phrase from the candidate character string; and a character string addition section configured to set the candidate character string as an important character string when the number of the important phrase being deleted is one or more.

A requirement acquisition method according to the present invention is a requirement acquisition system implemented by a computer. The requirement acquisition method includes: extracting, from a document being a group of a plurality of character strings, one or more partial string which is a common part of the plurality of character strings as an important phrase; finishing processing when the important phrase does not exist; extracting a representative character string of the document as a candidate character string when the important phrase exists; deleting the candidate character string from the document; deleting the important phrase from the candidate character string; and setting the candidate character string as an important character string when the number of the important phrase being deleted is one or more.

A requirement acquisition program according to the present invention is a program for making a computer perform the following steps: extracting, from a document being a group of a plurality of character strings, one or more partial string which is a common part of the plurality of character strings as an important phrase; finishing processing when the important phrase does not exist; extracting a representative character string of the document as a candidate character string when the important phrase exists; deleting the candidate character string from the document; deleting the important phrase from the candidate character string; and setting the candidate character string as an important character string when the number of the important phrase being deleted is one or more. Note that, the requirement acquisition program according to the present invention can be stored in a storage device or a storage medium.

The character string is any one of, or a combination of, a sentence, a row, a paragraph, or a chapter. Namely, at least one of a sentence, a line, a paragraph, and a chapter is treated as a character string.

Further, when a character string which represents a document is extracted as a candidate character string, the distance between the document and each character string included in the document is calculated, and the character string whose distance is minimum is extracted as the candidate character string.

Moreover, when a character string which represents the document is extracted as a candidate character string, the distance between each character string and the document is calculated based on an approximation calculation method of the Kolmogorov complexity.

In the present invention, not merely listing important phrases, but important parts of sentences and the like can be extracted, so that the analyzer can grasp an outline of the requirements by interpreting the meanings without referring to the original document. Therefore, analyzer's efforts and hours can be reduced.

Further, in the conventional manner using the morphological analysis, there is a problem that important phrases cannot be extracted correctly because of erroneous divisions of words. On the other hand, in the present invention, based on the partial string, the important phrases can be more correctly extracted. For example, in a case of three sentences "regarding foreigners suffrage", "here, suffrage is . . . ", and "of foreigners . . . ", when a conventional analysis is applied, only "foreign" can be extracted. In the present invention, "foreigners" and "suffrage" can be extracted as important phrases and displayed with accentuation.

Further, in the present invention, even when an unknown word such as a coined word created by combining known words or an abbreviation in which a part of a known word is omitted exists, an important part can be extracted. Moreover, even for an unknown word such as a coined word or abbreviation, they can be accentuated as an important phrase.

As explained above, in the present invention, from a document being a group of a plurality of character strings, one or more partial string which is a common part of the plurality of character strings is extracted as an important phrase. When the important phrase does not exist, the processing is finished. When the important phrase exists, a representative character string of the document is extracted as a candidate character string, the candidate character string is deleted from the document, and the important phrase are deleted from the candidate character string. When the number of the important phrase being deleted is one or more, the candidate character string is set as an important character string, and the processing returns to the character string extraction section.

In the present invention, because character strings already extracted from a document is deleted, the character string extraction part calculates a different degree of similarity in the processing after the second time. Namely, it is not the case that the candidate character strings are extracted in the order of the smallness of the distance, and it is not necessary to determine a threshold value in advance.

An example where a sentence is adopted as the character string is shown below. The document is assumed to consist of the following five sentences, for example.

"Input data", "process data", "process data after input", "output result", "output result after process data".

At first, the important phrases in a case where the partial string of the maximum length is adopted are the followings: "data", "input", "process", "after", "result", "output".

The character string extraction section extracts "process data after input" by the processing at the first time. The phrase deletion section deletes "data", "input", "process", "after" from the group of the important phrases, so that the remaining important phrases are "result" and "input".

The character string extraction section extracts "output result" by the processing at the second time, because the document is modified to "input data", "process data", "output result", and "output result after process data" by the process at the first time.

Here, because the similarity with the document where the first sentence is deleted is recalculated, the degree of the similarity of the second sentence with the first sentence is not necessarily high.

The phrase deletion section deletes "output" from the group of important phrases, so that the operation is finished.

As a result of implementing the present invention, the extracted character string is "process data after input", "output result".

In the present invention, because the phrase deletion section deletes important phrases, there is a case where even for the candidate character string, no important phrase exists and it does not become an important phrase.

In the above, some exemplary embodiments of the present invention are described in detail. However, actually, the present invention does not limited to those exemplary embodiments, and even some modification is applied to them in a scope where the intention of the present invention is not deviated, they are included in this invention.

Note that, the present invention claims the priority based on Japanese Patent Application No. 2010-071860, and the disclosure in Japanese Patent Application No. 2010-071860 is incorporated into the present invention by this reference.

The invention claimed is:

1. A requirement acquisition system comprising:
   a phrase extraction section, implemented by a processor, configured to extract, from a document being a group of a plurality of character strings, one or more respective partial string which is a common part of the plurality of character strings as one or more respective important phrase;
   a phrase storage section, implemented by a processor, which stores the one or more important phrase;
   a character string extraction section implemented by a processor which is configured, for each of the one or more important phrase, to finish processing when the important phrase does not exist, and to extract a representative character string of the document as a respective candidate character string and delete the respective candidate character string from the document when the important phrase exists;
   a phrase deletion section implemented by a processor which is configured to delete the respective important phrase of the one or more important phrase following finishing of processing related to the respective important phrase by the character string extraction section;
   a character string addition section implemented by a processor which is configured, for each respective candidate character string, to set the respective candidate character string as an important character string when the number of the important phrase being deleted is one or more; and
   an important character string storage section implemented by a processor which is configured to store the important character string.

2. The requirement acquisition system according to claim 1, wherein the character string extraction section is configured to calculate a distance between each of the plurality of character strings and the document, and extract a character string among the plurality of character strings the distance thereof is minimum as the candidate character string.

3. The requirement acquisition system according to claim 2, wherein the character string extraction section is configured to calculate the distance between each of the plurality of character strings and the document based on an approximation calculation method of a Kolmogorov complexity.

4. A requirement acquisition method performed by a computer comprising:
   extracting, from a document being a group of a plurality of character strings, one or more respective partial string which is a common part of the plurality of character strings as one or more respective important phrase;
   storing the or nor more important phrase;
   for each of the one or more important phrase, finishing processing when the important phrase does not exist;
   for each of the one or more important phrase, extracting a representative character string of the document as a respective candidate character string when the important phrase exists;
   for each of the one or more important phrase, deleting the respective candidate character string from the document;
   deleting the respective important phrase of the one or more important phrase following finishing of processing related to the respective important phrase by the extraction; and
   for each respective candidate character string, setting the respective candidate character string as an important character string when the number of the important phrase being deleted is one or more and
   storing the important character string.

5. The requirement acquisition method according to claim 4, further comprising:
   calculating a distance between each of the plurality of character strings and the document; and
   extracting a character string among the plurality of character strings the distance thereof is minimum as the candidate character string.

6. The requirement acquisition method according to claim 5, wherein the distance between each of the plurality of character strings and the document is calculated based on an approximation calculation method of a Kolmogorov complexity.

7. A non-transitory computer readable storage medium having stored therein a requirement acquisition program causing a computer to execute the requirement acquisition method according to claim 4.

* * * * *